United States Patent [19]

Dixon

[11] 4,035,731
[45] July 12, 1977

[54] COMBINED BINOCULAR RADIO UNIT

[76] Inventor: Warren Dixon, 6434 S. King Drive, Chicago, Ill. 60637

[21] Appl. No.: 651,064

[22] Filed: Jan. 21, 1976

[51] Int. Cl.² .......................................... H04B 1/08
[52] U.S. Cl. .............................. 325/361; 325/310; 325/352
[58] Field of Search .............. 325/16, 66, 310, 352, 325/353, 355, 356, 361; 200/61.58 R, 61.62, 61.7

[56] References Cited

U.S. PATENT DOCUMENTS

| 2,771,526 | 11/1956 | Claras et al. | 325/352 |
| 3,246,587 | 4/1966 | Oliver, Jr. | 325/361 |
| 3,277,303 | 10/1966 | Jensen et al. | 325/310 |
| 3,761,815 | 9/1973 | Bower | 325/361 |

FOREIGN PATENT DOCUMENTS

| 2,217,474 | 10/1973 | Germany | 325/310 |

Primary Examiner—Robert L. Griffin
Assistant Examiner—Jin F. Ng
Attorney, Agent, or Firm—Eugene V. Mandel

[57] ABSTRACT

A combined binocular-radio unit including a housing having disposed therein a binocular radio receiver and mechanism for the activation of the radio receiver when the binocular is extended from the housing for use.

5 Claims, 4 Drawing Figures

COMBINED BINOCULAR RADIO UNIT

BACKGROUND OF THE INVENTION

The present invention relates to a novel combination of binoculars and radios and, more particularly to a radio and binocular contained in a single housing for use and storage.

The prior art includes several combinations of radios as an integral part of other devices such as disclosed in U.S. Pat. No. 2,899,881 to Lopez issued Aug. 18, 1959. Also, in the U.S. Pat. No. 2,927,995 to Francis issued Mar. 8, 1960 a fishing rod with a radio handle is disclosed. A combination radio-typewriter is disclosed in the U.S. Pat No. 3,500,210 to Tashian issued Mar. 10, 1970.

These devices permit the use of a radio in conjunction with a device used for some other purpose. The prior art, however, makes no reference to a device that provides binoculars and a conventional radio unitarily housed.

SUMMARY OF THE INVENTION

Therefore, it is a primary object of the present invention to provide a radio and binocular contained in a single housing.

It is a futher object of the present invention to provide a combined radio and binocular unit that includes activation means that turn the radio on when the binoculars are extended from the housing.

It is a still further object of the present invention to provide a combined radio and binocular unit that is lightweight, compact, and self-contained.

These objects, as well as further objects and advantages, of the present invention will become readily apparent after reading the description of a non-limiting illustrative embodiment and the accompanying drawing.

A combined binocular-radio unit according to the principles of the present invention comprises a housing, receiving means disposed within said housing, optical means pivotally affixed within the housing and being extensible outside the same, and activating means affixed to said optical means and adapted to turn on and off said receiving means when the optical means are extended and retracted in cooperation with said housing.

BRIEF DESCRIPTION OF THE DRAWINGS

In order that the present invention may be more fully understood it will now be described, by way of example, with reference to the accompanying drawings in which.

DESCRIPTION OF THE PREFERRED EMBODIMENT

Figure 1:
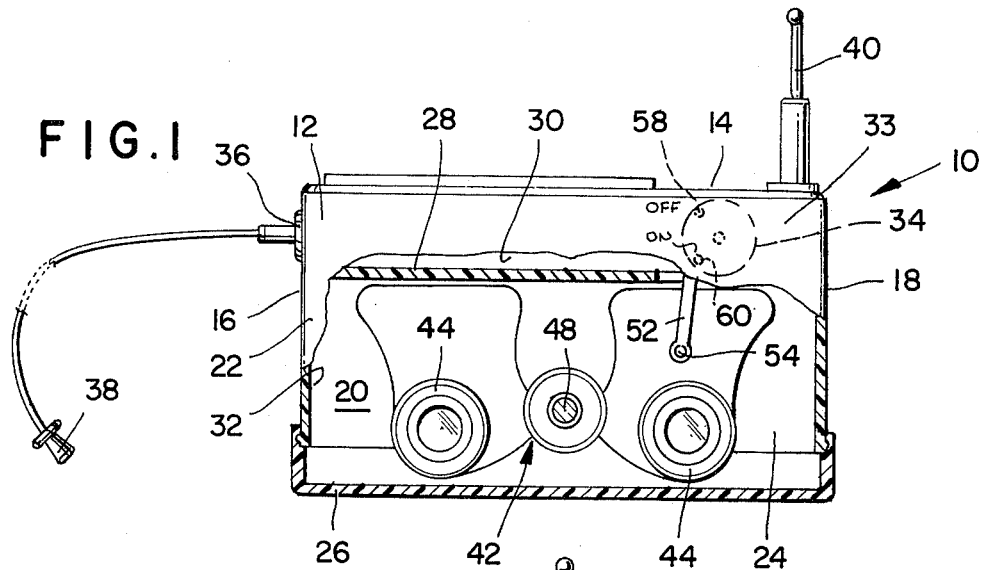
FIG. 1 is a front view in elevation of the preferred embodiment of the present invention showing the binoculars retracted within the housing.
Figure 2:
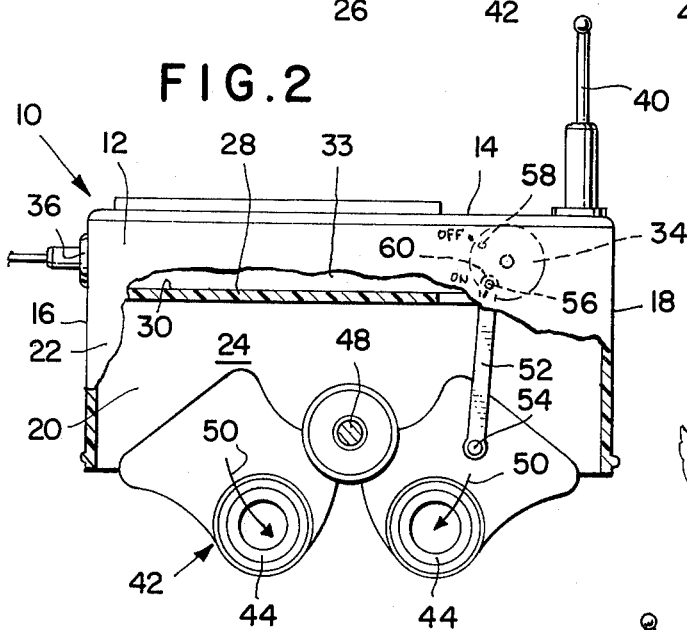
FIG. 2 is a front view in elevation of the preferred embodiment of the present invention showing the binoculars extended from the housing.

Referring now to the figures and more particularly to the preferred embodiment illustrated in FIGS. 1 and 2 showing a combination binocular-radio unit 10 having a housing 12. The housing 12 includes a top 14, a pair of sides 16 and 18, a rear wall 20, and a front wall 22 adapted to cooperate to form a chamber 24. A snap-on cover 26 for enclosing the housing 14 when not in use is shown in position on the bottom of the housing 12. The chamber 24 is divided by a partition 28 forming an upper chamber 30 and a lower chamber 32. The upper chamber 30 has receiving means in the form of a conventional radio 33 disposed therein. The radio 33 may be AM, FM, or a combination thereof. A rotational switch 34 turns the radio 33 on and off. A jack 36 for an earphone 38 is disposed on the side 16. An antenna 40 for use as an aid in reception by the radio 33 is mounted on the top 14. Optical means in the form of binoculars 42 having conventional oculars 44 and lens barrels 46 are pivotally affixed within the lower chamber 32 by a pivot 48. Pivot 48 is affixed perpendicular to the rear wall 20 and the front wall 22 of the housing 12. When the binoculars are not in use they are contained entirely within the lower chamber 32. When the user wishes to use the binoculars they are extended from the lower chamber 32 by pivoting in the direction of the arrows 50 until the oculars 44 and the lens barrel 46 of the binoculars 42 are out of the chamber 32 unobstructed by the housing 12.

Figure 3:
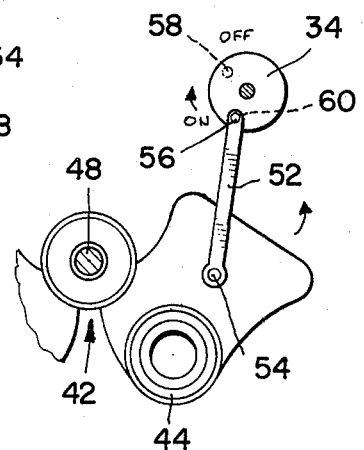
FIG. 3 is an enlarged pictorial representation of the activating means.

FIG. 3 illustrates the activating means which is disposed within the housing 12 employing a bar 52 pivotally affixed at one end to the binoculars 42 by a pivot 54 and pivotally affixed on the opposite end to the rotational switch 34 by a pivot 56. When the binoculars 42 are extended from the housing 12 the bar 52 urges the rotational switch 34 to the on position 58. When the binoculars 42 are retracted the bar 52 urges the switch 34 to the off position 60. Therefore, the radio 33 is turned on and off without any effort by the user except for extending and retracting the binoculars.

Figure 4:
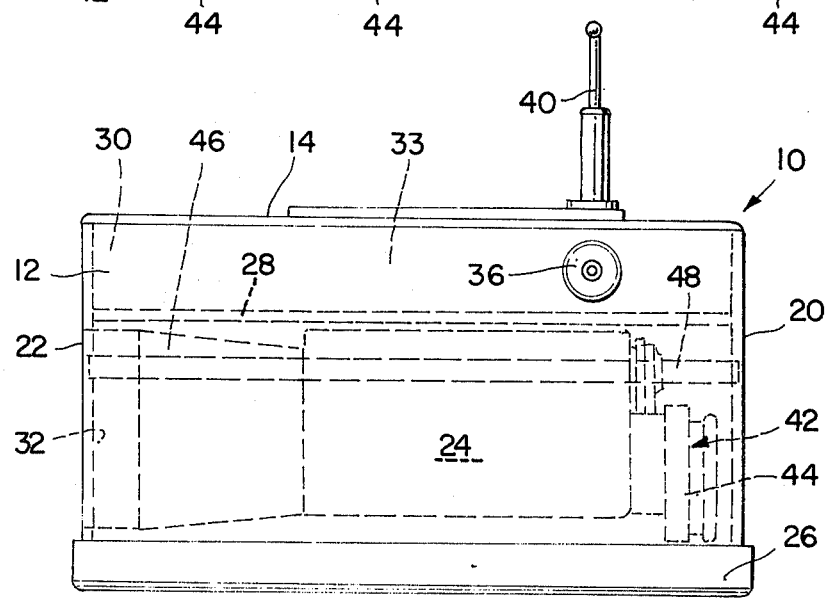
FIG. 4 is a side view of the preferred embodiment of the present invention showing the binoculars within the housing.

FIG. 4 illustrates a side view of the preferred embodiment of the present invention showing the relative placement of the radio 33 and the binoculars 42 within the chamber 24.

The receiving means are preferably solid state to conserve space. The optical means may be designed similarly to conventional binoculars but preferably they are of the new compact optical type. The housing may be constructed of plastic or fine wood as an enhancement to the appearance of the same. The radio is powered by a standard battery or possibly by a solar cell for economy.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A combined binocular-radio unit comprising:
   a. a housing;
   b. radio receiving means disposed within said housing;
   c. binocular means pivotally affixed within said housing and being extensible outside said housing; and d. activating means affixed to said binocular means to turn on and off said radio receiving means when said binocular means are extended and retracted in cooperation with said housing.

2. A combined binocular-radio unit according to claim 1, wherein said radio receiving means comprise a conventional broadcast band radio receiver.

3. A combined binocular-radio unit according to claim 1, wherein said housing is constructed to store said binocular means when not in use therein.

4. A combined binocular-radio unit according to claim 1, wherein said activating means comprises a bar pivotally affixed on one end to said binocular means and pivotally affixed on the opposite end to a switch in cooperation with said radio receiving means to urge said switch to the on position when said binocular means is extended from said housing and to urge said switch to the off position when said binocular means are retracted within said housing.

5. A combined binocular-radio unit according to claim 4, wherein said switch is of the rotational type.

* * * * *